June 6, 1939. A. DÜRIG 2,161,702
REVERSING GEARING COMPRISING PRESSURE FLUID OPERATED CONTROL COUPLING
Filed May 2, 1938
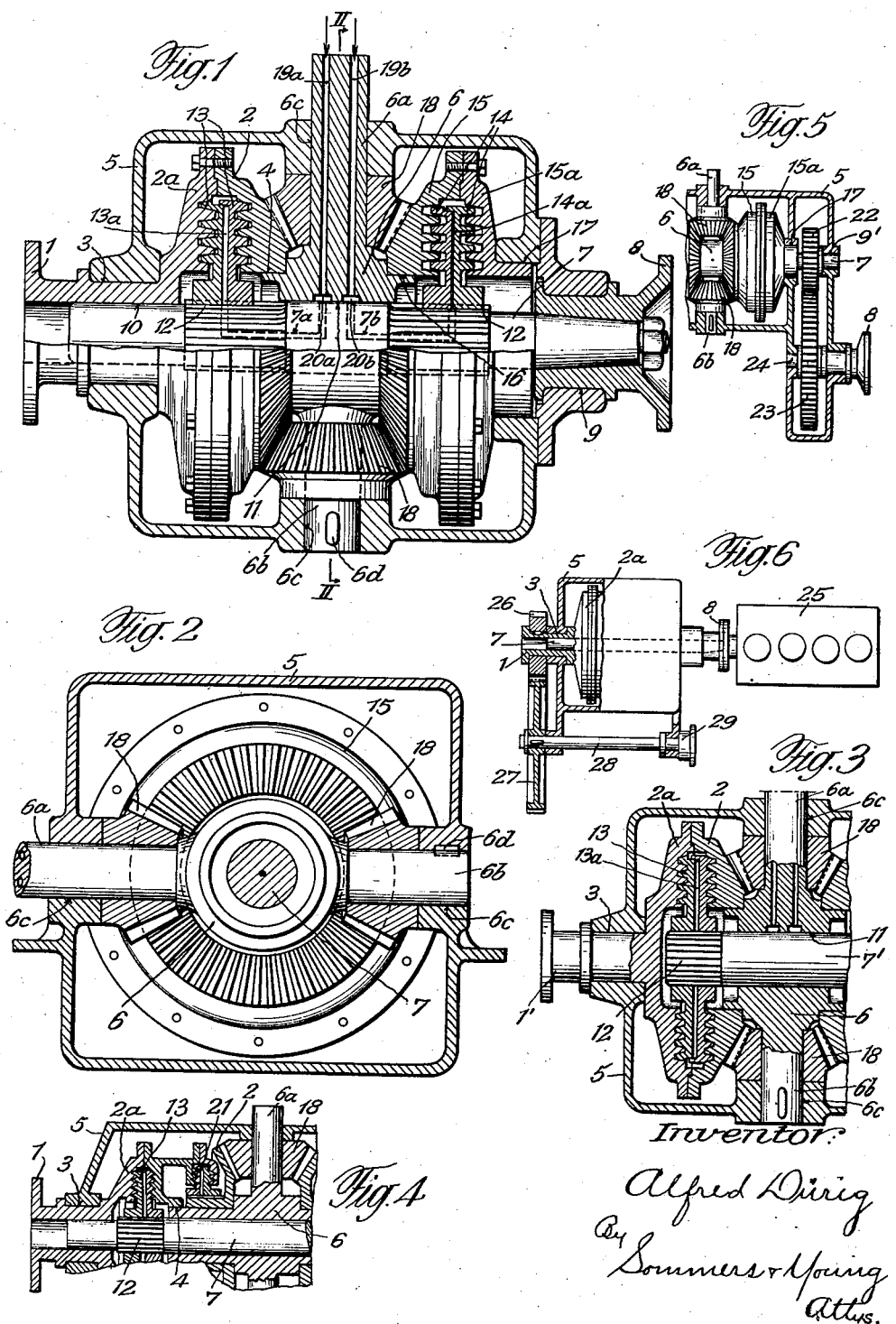

Patented June 6, 1939

2,161,702

UNITED STATES PATENT OFFICE 2,161,702

REVERSING GEARING COMPRISING PRESSURE FLUID OPERATED CONTROL COUPLING

Alfred Dürig, Winterthur, Switzerland, assignor to Schweizerische Lokomotiv- und Maschinenfabrik, Winterthur, Switzerland Application May 2, 1938, Serial No. 205,550
In Germany May 5, 1937

5 Claims. (Cl. 74—379)

This invention relates to fluid pressure operated coupling devices for reversing gearings.

The invention is particularly concerned with coupling devices for gearings of this kind which are especially suited for ships' drives and in which the driving shaft is coaxial with the driven shaft. Hitherto, the changing over of the direction of rotation was effected in the gearing by means of three intermeshing bevel gears, two of which, that may be termed "longitudinal bevel gears", being rotatable about the longitudinal axis of the reversing gearing, whereas the third gear, which may be termed "transverse bevel gear" is rotatable as an intermediary bevel gear about a stationary transverse axis of the casing of the reversing gearing. These known gearings are ordinarily of very great dimensions, particularly as regards the length thereof, especially if driving efforts of, for example, 200 H. P. or more are to be transmitted by the gearing.

According to this invention provision is made for a compact construction of the driving gearing by positioning pressure fluid operated friction clutches for forwards and rearwards driving immediately at the outer ends of the two longitudinal bevel gears and arranging two or more intermediary bevel gears (transverse bevel gears) at regular distances apart around the circumferences of the longitudinal bevel gears in intermeshing relation with both of the latter wheels, the intermediary bevel gears being mounted on a cross carrier which is secured to the stationary casing of the gearing and extends through the same transversely thereof.

The feature last referred to provides for preventing the longitudinal bevel gears from bearing against their bearing surfaces owing to the fact that the pressures set up between the gear teeth of, for example, two opposing intermediary gears and those of the longitudinal bevel gears compensate each other in regard to the respective bearing surfaces of the latter gears.

In the accompanying drawing four embodiments of the invention are illustrated by way of example only, in which Fig. 1 shows a longitudinal section of a reversing gearing representing a first embodiment of the invention;

Fig. 2 is a cross section of Fig. 1 on the line II—II in Fig. 1;

Fig. 3 is a view of a modified detail of Fig. 1;

Fig. 4 is a longitudinal section of a second embodiment of the invention,

Fig. 5 is a longitudinal section of a third embodiment of the invention, and

Fig. 6 is a sectional elevational view of a fourth embodiment of the invention.

Referring to the first embodiment of the invention, the shaft 1 of the reversing gearing is driven by a motor disposed on the left in this figure (not shown). The shaft 1, which is hollow, is firmly connected to a bevel gear 2 which is rotatable about the longitudinal axis of the reversing gearing. This shaft is mounted on the one hand in the stationary casing 5 of the gearing, at 3, and on the other hand on a hub portion 4 of a cross carrier 6 which extends through the casing 5 transversely thereof and is fixed thereto by means of seatings 6c and a cross cleat 6d. The driven shaft 7 is rigid with a power delivery head 8 having a terminal connecting flange. This shaft is mounted in the casing 5, by means of the delivery head, at 9, and in the hollow driving shaft 1, at 10. The shaft 7 is further supported at its middle portion by a bearing 11 formed in the cross carrier 6.

The driven shaft 7 carries the inner coupling disks 13, 14 for forwards and rearwards driving respectively by means of grooved portions 12, so as to be displaceable longitudinally of this shaft. The pair of disks 13 are housed within a casing 2a rigid with the shaft 1 and the bevel gear 2, whereas the pair of disks 14 are housed within a casing 15a rigid with a bevel gear body 15. The casing 15a is mounted on the one hand on the cross carrier, at 16, and on the other hand in the stationary casing 5, at 17. The bevel gears 2, 15 mesh with smaller intermediary bevel gears 18 which are mounted on bearing pins 6a, 6b of the cross carrier 6.

The inner pairs of coupling disks 13, 14 can be forced apart by introducing pressure oil into spaces 13a, 14a between the respective pairs, in order to produce frictional engagement between these disks and mating interior grooves in the casings 2a and 15a respectively which provide the outer coupling portions of the respective clutches.

The operating pressure oil is supplied to the spaces 13a, 14a respectively through passages 19a, 19b and annular grooves 20a, 20b in the stationary cross carrier 6, 6a, and passages 7a, 7b in the shaft 7. The cock for selectively supplying pressure oil to the passages 19a and 19b and allows at the same time to interrupt the supply of oil to both of these passages (running at no load) is not shown in the drawings as a matter known per se. The same applies for the pressure oil pump which is preferably driven from the motor referred to.

The operation of the reversing gearing according to the invention is very simple. For driving forwards pressure oil is supplied to passage 19a in which way shaft 1 is directly coupled to shaft 7, so that the bevel gears 2, 18 and 15 rotate idly. For driving rearwards pressure oil is supplied to passage 19b, in which way, shaft 7 is coupled to bevel gear 15, whereas clutch 13 housed in bevel gear 2 is disconnected, due to space 13a being no longer supplied with pressure oil. During driving rearwardly the torque is transmitted to the bevel gear 15 and thus to the shaft 7, via the intermediary bevel gears 18, while the direction of rotation is reversed. The operation of disconnecting the clutches can be accelerated by means of pressure oil with the aid of any suitable expedients, such as disclosed, for example, in the U. S. A. Patent 1,472,930.

The reversing gearing according to the invention results in the following essential advantages:

Short overall length, minimum space requirement, absence of unbalanced pressures on the gear teeth of the gears 2 and 15 and bearing pressures on the bearing surfaces 3, 4, 16 and 17 in consequence of such pressures on these gear teeth, due to the presence of more than one intermediary bevel gear. The two clutches for driving forwards and rearwards are of equal size, in contrast to the known reversing gearings in which for driving rearwards a movable part of the gearing is coupled to the stationary casing thereof. The oil passages for the supply of operating oil can be arranged in the middle portion of the shaft 7, where this shaft is strongest, owing to the possibility of supplying the oil from the middle of the shaft, so that the arrangement of oil passages in the portions most strained of the shafts 1 and 7 can be dispensed with (in the hollow shaft 1, for example, at the bearing 3, and in the delivery head 8, at the bearing 9).

Instead of the first shaft 1, the second shaft 7 may be coupled with the shaft of the motor 25 (Fig. 6), so that the shaft 1 functions as the power delivery shaft. Also in such an arrangement the driving shaft 7 can be coupled to the driven shaft 1 directly. In driving rearwards the bevel gears function to transmit power in the same way as if the drive is derived from the shaft 1. During running at no load the advantage ensues from this arrangement that none of the gears is rotated, so that the frictional losses accruing from running at no load are reduced, as against an arrangement in which the shaft 1 functions as the driving shaft and all the bevel gears are rotated, so that frictional resistance is set up in their bearings.

The bevel gears 2 and 15 may be mounted on the shaft 7 directly instead of on the cross carrier 6, at 4 and 16 respectively. It is, however, a fact that in mounting the gears in the manner last-mentioned the work of friction is increased while driving rearwards, due to the shafts 1 and 7 rotating in opposite directions.

In the second embodiment of the invention shown in Fig. 4, the bevel gear 2 is not formed on a part rigid with the shaft 1, but is mounted on an extended hub portion 4 of the cross carrier and adapted to be coupled to the driven shaft 1 through the intermediary of an additional clutch 21. In this arrangement, the shaft 1 carries, in the same manner as shown in Fig. 1, the casing 2a for the pair of coupling disk 13 that are displaceable relative to the shaft 7, the shaft 1 being mounted on the one hand, at 3, and on the other, for example on the hub of the bevel gear 2 or at the side of the bevel gear 2 on the extended hub portion 4 of the cross carrier 6. This arrangement has the advantage that the degree of efficiency of the gearing is increased while driving forwards, due to the fact that the bevel gears are then no longer rotating, so that no friction is set up in the bearings. In driving rearwards, clutch 21 is connected in addition to clutch 14, the oil supply passages leading to the former clutch not being shown.

In the modified arrangement shown in Fig. 3, the shaft 7' has no bearing in the shaft 1' which is solid instead of hollow as described in connection with Figs. 1 and 2, the shaft 7' thus being mounted only in the cross carrier 6 and the bearing 9. Due to the absence of bearing 10, the advantage is obtained that less friction is set up while driving rearwards or at no load, and since the shaft 1' is no longer hollow the diameter of the bearing 3 can be accordingly reduced.

In the third embodiment of the invention shown in Fig. 5, the reversing gearing is provided with a speed reduction gear 22, 23, which is intercalated between an unsupporting portion of the driven shaft 7 extending beyond the bearing 17 and a stub shaft 24. The outer end of this extension of the shaft 7 is mounted in a bearing 9' supported by an outer end wall of the casing 5, the delivery head 8 being also mounted in this end wall, whereas the stub shaft 24 one end of which is received in the delivery head is mounted at its other end in a bearing supported by a lower extension of the inner end wall of the casing 5.

With this arrangement, in which the shaft 7 is the driven shaft (as shown in Fig. 1), the speed reduction gear is wholly encased. Alternatively, the mounting arrangement for the wheels of this gear may be so modified that the gear is situated on the outside of the casing 5.

A fourth embodiment of the invention, as shown in Fig. 6, in which the motor 25 is coupled to the shaft 7, as previously referred to, comprises a speed reduction gear 26, 27 intercalated between the shaft 1 and a jack shaft 28 which is mounted in bearings provided in lower mounting arms of the casing 5. The end of the shaft 28 remote from the wheel 27 carries a power delivery head 29 having a terminal connecting flange for a shaft or other power transmission element to be driven.

Instead of pressure oil any other liquid or gaseous operating medium may be employed.

Furthermore, the arrangement of the supply passages 19a, 19b may be varied from the showing of Fig. 1 by arranging these passages within an additional arm of the cross carrier 6 which does not serve as a bearing pin for an intermediary bevel gear 18, at the same time.

Moreover, the cross carrier 6 may straddle the shaft 7 in stirrup fashion and the oil supply may be led through an annulus loosely mounted on the middle portion of the shaft 7.

Various changes and modifications may be made in the practice of my invention without departing from the principle or spirit thereof, by adding customary practice and established knowledge of the art to the present disclosure and the scope of the appended claims is not to be regarded as limited except as specified therein.

I claim:

1. A fluid operated coupling apparatus, for control of direct drive and reversing apparatus for sectional shafts having a pair of main longitudinal bevel gears surrounding the axis of the shaft and transverse intermediary bevel gears engaging with said longitudinal gears and uniformly distributed around the peripheries of said longitudinal gears, comprising two fluid-pressure operated friction clutches arranged immediately on the outer ends of said longitudinal gears in coaxial relation therewith, a continuous cross carrier loosely accommodating said transverse bevel gears and having passages formed therein leading to said shaft, and means for selectively conducting said fluid to said clutches for driving one section of said shaft in either direction relative to the other.

2. A fluid operated coupling apparatus, for control of direct drive and reversing apparatus for sectional shafts having a pair of main longitudinal bevel gears surrounding the axis of the shaft and transverse intermediary bevel gears engaging with said longitudinal gears and uniformly distributed around the peripheries of said longitudinal gears, comprising two fluid-pressure operated friction clutches arranged immediately on the outer ends of said main gears in coaxial relation therewith, a continuous cross carrier loosely accommodating said intermediate bevel gears and having passages formed therein leading to said shaft, pressure fluid passages arranged within said cross carrier for selectively conducting said fluid to said clutches for driving one section of said shaft in either direction relative to the other, and one of said shaft sections having fluid passages arranged only within the middle portion thereof for communication with said pressure fluid passages of the cross carrier and with said clutches.

3. A fluid operated coupling apparatus, for control of direct drive and reversing apparatus for sectional shafts having a pair of main longitudinal bevel gears surrounding the axis of the shaft and transverse intermediary bevel gears engaging with said longitudinal gears and uniformly distributed around the peripheries of said longitudinal gears, comprising two fluid-pressure operated friction clutches arranged immediately on the outer ends of said main gears in coaxial relation therewith, a continuous cross carrier loosely accommodating said intermediate bevel gears and giving passage to said shaft, bearing means provided on each side of said cross carrier coaxially with said shaft for cooperation with complementary bearing means on the inner ends of said main bevel gears, and means for selectively conducting said fluid to said clutches for driving one section of said shaft in either direction relative to the other.

4. A fluid operated coupling apparatus, for control of direct drive and reversing apparatus for sectional shafts having a pair of main longitudinal bevel gears surrounding the axis of the shaft and transverse intermediary bevel gears engaging with said longitudinal gears and uniformly distributed around the peripheries of said longitudinal gears, comprising two fluid-pressure operated friction clutches arranged immediately on the outer ends of said main gears in coaxial relation therewith, a continuous cross carrier loosely accommodating said intermediate bevel gears, a central shaft bearing provided in said cross carrier, a casing accommodating said bevel gear system and said friction clutches, and having a terminal bearing providing together with said central shaft bearing the sole bearing means for one section of said shaft, and means for selectively conducting said fluid to said clutches for driving one section of said shaft in either direction relative to the other.

5. In an arrangement of fluid clutch devices, a rectangular bevel gearing comprising at least two intermediary bevel gears cooperating with a pair of main bevel gears coaxially surrounding a sectional shaft, a driving motor coupled to the section of said shaft normally providing the driven shaft, two pressure fluid operated friction clutches arranged immediately on the outer ends of said main gears in coaxial relation therewith, a continuous cross carrier loosely accommodating said intermediary bevel gears uniformly distributed over the circumference of said main bevel gears and having passages formed therein for supplying fluid to said shaft, and means for selectively conducting said fluid to said clutches for driving by means of said motor the shaft section normally providing the driving shaft in either direction relative to said shaft section normally providing said driven shaft.

ALFRED DÜRIG.